United States Patent [19]

Turanskyj et al.

[11] Patent Number: 4,723,781

[45] Date of Patent: Feb. 9, 1988

[54] LIQUID SEALED SHAFT SEAL

[75] Inventors: Lubomyr Turanskyj, Oberhausen; Manfred Heinen, Rees; Joachim Kotzur, Oberhausen, all of Fed. Rep. of Germany

[73] Assignee: MAN Gutehoffnungshütte GmbH, Fed. Rep. of Germany

[21] Appl. No.: 52,706

[22] Filed: May 20, 1987

[30] Foreign Application Priority Data

May 23, 1986 [DE] Fed. Rep. of Germany ....... 3617393

[51] Int. Cl.⁴ .......................... F16J 15/36; F16J 15/40
[52] U.S. Cl. ........................................ 277/27; 277/87; 277/135; 277/203; 277/83
[58] Field of Search ...................... 277/3, 27, 135, 203, 277/134, 133, 85–89, 93 R, 93 SD, 83, 173

[56] References Cited

U.S. PATENT DOCUMENTS

| | | | |
|---|---|---|---|
| 3,035,841 | 5/1962 | Riester | 277/27 X |
| 3,471,157 | 10/1969 | Swearingen | 277/135 X |
| 3,746,350 | 7/1973 | Mayer et al. | 277/134 X |
| 3,778,070 | 12/1973 | Shimura | 277/134 X |
| 4,010,960 | 3/1977 | Martin | 277/203 X |
| 4,084,825 | 4/1978 | Ludwig | 277/134 X |

FOREIGN PATENT DOCUMENTS 446836 5/1936 United Kingdom .................. 277/83

Primary Examiner—Robert S. Ward
Attorney, Agent, or Firm—McGlew and Tuttle

[57] ABSTRACT

A liquid-sealed shaft seal for sealing the lead-through between an inner space and an outer space of a shaft with feed bores for a sealing liquid which is supplied at higher pressure than the pressure in the inner space. The seal includes partial seal gaps extending on both sides of these feed bores, and includes an inner partial seal gap in the form of a threaded shaft seal with recycling toward the sealing liquid feed. A disk with a larger outside diameter than the diameter of the inner partial seal gap is placed between the inner and outer partial seal gaps, and forms a pump chamber with the seal housing. A radial pressure increase of the supplied sealing liquid occurs in the pump chamber at higher speeds of rotation, and bores that are connected to a pressure chamber open into its radially outer area. A pressure chamber is formed by the seal housing and a slip ring which is located at the end of a threaded shaft seal toward the inner space, and it is pressed axially against the shaft or shaft bushing when the shaft is stopped and at low speeds, by an element producing an axial force toward the outer space, and by gas forces. At higher speeds the ring seal is lifted away from the shaft or shaft bushing by the radial pressure increase produced by the rotating disk.

11 Claims, 7 Drawing Figures

LIQUID SEALED SHAFT SEAL

FIELD AND BACKGROUND OF THE DISCLOSURE

This invention relates in general to shaft seals and in particular to a new and useful liquid sealed shaft with a partial seal gap being constructed as a threaded shaft seal.

This invention particularly concerns a shaft seal for sealing the lead-through between an inner space and an outer space of a shaft with feed bores for sealing liquid supplied at higher pressure than the pressure in the inner space, and partial seal gaps extending on both sides of these feed bores, with the partial seal gap on the side of the inner space being designed as a threaded shaft seal with recycling toward the sealing liquid feed.

Threaded shaft seals are known. They have the advantage over a seal with a smooth sealing gap that under the action of the increased pressure at the outlet of the feed bores compared to the inner space they produce recycling of sealing liquid flowing away from the feed bores over the inner sealing gap, by means of grooves incorporated in the shaft defining the seal gap or in the housing defining the seal gap at an angle to the axial direction, so that this sealing liquid leakage is limited. The sealing liquid entering the inner space in most cases is not usable because of contamination with the process gas in it.

However, this effect of recycling occurs only at higher speeds for which the grooves of the threaded shaft seal are designed. More severe leakage occurs when the shaft is stopped and at low speeds such as those that occur also in turbine startup in start/stop operation. An axial slip ring seal is known as a shutdown seal and a seal for low speeds, that has only slight leakage of sealing liquid. At higher speeds, however, high slip velocities are reached that lead to overheating and decomposition of the sealing liquid.

It is also known from German Patent No. 834 930 how to lift these slip rings away at higher speeds by centrifugal pressure produced by a rotating ring, with the seal then being produced by the rotating liquid ring.

This seal has the drawback that the rotating sealing liquid is severely heated because of the disk friction with the lack of liquid exchange.

The rotating liquid ring also forms a cylindrical interface with the adjacent process gas in the inner space which can lead to radial secondary flow with corresponding gas absorption in the sealing liquid, especially in the case of rotating liquid rings that are wide in the axial direction caused by the axial displacements of the shaft.

SUMMARY OF THE INVENTION

The invention provides a shaft seal that has extremely low sealing liquid leakage over the entire speed range and when the shaft is stopped there is little if any seal wear from excessively high temperatures.

In accordance with the invention a disk with a larger diameter than that of the inner partial seal gap is placed between the inner and outer partial seal gaps, which forms a pump chamber with the seal housing in which a radial pressure increase of the supplied sealing liquid occurs at higher speeds. The arrangement includes bores opening into its outer area that are connected to a pressure chamber that is formed by the seal housing. A slip ring is located at the end of the threaded shaft seal toward the inner space and it is pressed axially against the shaft by elements producing an axial force toward the outer space and gas forces when the shaft is stopped and at low speeds, and it is lifted away from the shaft at higher speeds by the radial pressure increase produced by the rotating disk.

Because most of the sealing liquid fed to the outer partial seal gap, or all of it, after leaving the feed bores, is fed beforehand through the chamber with the rotating disk, complete removal of the frictional heat produced takes place there. The sealing liquid rotating on the disk is also not connected to the process gas present in the inner space, so that in this case no mixing with gas is possible when producing the pumping action.

Particularly good outer cooling of the inner seal gap is produced when the feed bores for the sealing liquid, considered in the axial direction, are located at the end of the gasket toward the inner space defining the inner sealing gap in the radial direction outward. All of the sealing liquid can then be used for the outer cooling of this gasket.

This gasket is then appropriately designed as an L-shaped floating ring, with the L shape providing for a small thickness of the gasket and thus good heat transmission as well as good radial expansion in case of overheating as well as good radial mobility overall.

It is beneficial to form the outer sealing gap with a floating ring on the shaft also, to produce good radial mobility.

In case of high pressure differences between the inner space and the outer space, it is desirable to form the outer sealing gap of several floating rings connected in series.

However, in case of severe leakage in the outer sealing gap it may also be beneficial to supply a portion of the supplied sealing liquid radially from the outside through a throttle element controlled separately only just before the entry into the outer sealing gap.

It is also possible to conduct a portion of the sealing liquid supplied in the area of the sealing gap toward the inner space through a bypass in the chamber with the rotating disk; this chamber is then cooled from the outside.

Equalization of different pressures on the two sides of the disk can be produced also by controlling the radial pressure increase with projections, such as pump blades, attached on one side or both sides of the rotating disk.

In case of large axial motions of the shaft, axial mobility of the disk in the pump chamber on the shaft can prevent differences of the spacings of the disk from the chamber walls which limit its axial movement.

A certain axial mobility without the production of harmful secondary flows from unilaterally large wall distance can be produced by axial extensions and constrictions of the rotating disk as well as a confroming design of the adjacent chamber walls.

The desired separation can also be produced by spacers fastened to the chamber wall or to the rotating disk which run axially against the side walls of the pump chamber, which can then be designed as axial bearings.

The slip ring can be sealed from the seal housing to form a sealing liquid pressure chamber by a gasket in combination with a bellows, which at the same time can produce the axial pressure force of the slip ring on the shaft shoulder at low speeds and when stopped.

This can also be brought about by the combination of two gaskets with compression springs that are pressed outward from the inner space against the axial slip ring.

Laying out the gaskets at a larger diameter than the diameter of the sealing face of the slip ring can produce an additional sealing force when the shaft is stopped because of higher gas pressures in the inner space, so that the slip ring is then effective as a shutdown seal, even when the supply of sealing liquid is turned off.

Accordingly it is an object of the invention to provide a liquid seal shaft in which the housing for the rotational support of the shaft includes a sealed liquid which is supplied at a high pressure in an inner space of the housing and includes partial field gaps extending on both sides of the feed bores which are provided for sealing liquids and which also includes a pump chamber operated by rotation of the shaft which pressurizes a partial seal defined between a slip ring on one end of the shaft and the inner space of the housing.

A further object of the invention is to provide a liquid sealed shaft seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
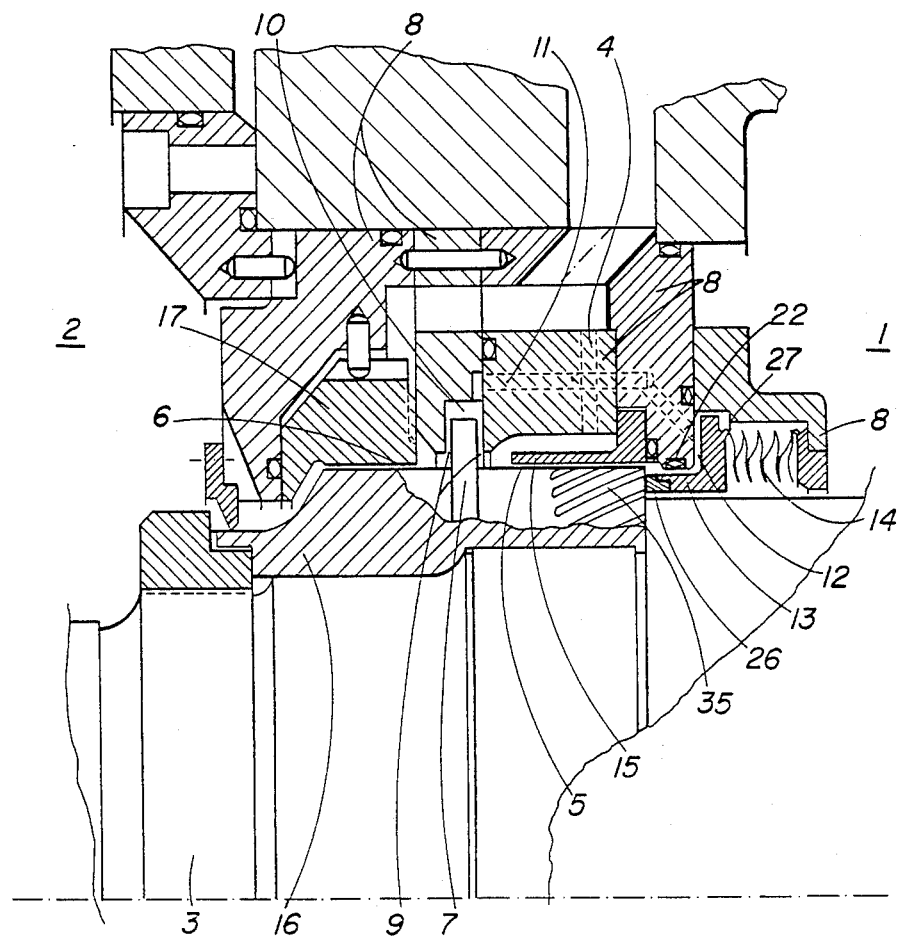
FIG. 1 is an axial sectional view of a liquid-sealed shaft seal constructed in accordance with the invention.

Referring to the drawings in particular the extension embodied therein comprises: a liquid-sealed shaft seal which includes a shaft housing or a seal housing 8 having an inner space 1 on one side which is sealed with respect to another space 2 on an opposite side of the housing. The housing has feed bores 4 for a sealing liquid which is supplied at a higher pressure than the pressure of the inner space 1. The housing 8 and the shaft 3 define annular first and second partial seal gaps 5 and 6 on respective sides of the feed bores. A disk 7 carried by the shaft is of a larger diameter than the partial seal gaps 5 and 6 and it rotates in a pump chamber 9 which is defined by the housing 8 around the shaft 3. The housing forms a pump chamber 9 around the shaft and the disk 7 in which there is a radially extending pressure increase of the supplied liquid during rotation of the shaft at higher speeds. The housing has bores 11 which open into the radially outer end portion of the pump chamber 9.

In accordance with the invention a slip ring 13 is arranged over the shaft 3 adjacent the inner space 1 and defines a high pressure chamber 12 between the ring and the housing which is connected to the radially outer area of the pump chamber 9. Spring means, which in the embodiment of FIG. 1 comprises bellows 14, urge the slip ring 13 toward the shaft portion which in the embodiment shown includes a shaft bushing 16 and presses the slip ring against the shaft bushing 16 when the shaft is stopped or it runs at low speeds; this closes the partial seal gap 26. The high pressure portion of the pump chamber 9 produces a pressure on the slip ring 13 at high speeds so as to displace it away from the shaft bushing 16.

According to FIG. 1, the liquid-sealed shaft seal is placed in a seal housing 8 to seal the lead-through of the shaft 3 between an inner space 1 and an outer space 2. Sealing liquid is supplied through feed bores 4, and then flows out over a floating ring 15.

Most of the sealing liquid then flows through a pump chamber 9 and an outer partial seal gap 6, which is formed by a floating ring 17 and a shaft bushing 16, and then flows to the outer space 2.

A small portion of the sealing liquid is fed through an inner partial seal gap 5 that is formed by the floating ring 15 and the shaft bushing 16 and then flows to a sealing gap 26 which is formed by an axial shoulder on the shaft bushing 16 and a slip ring 13 located a front of it.

When the shaft is shut down or when it operates at low speeds the slip ring 13 is pressed axially against the shoulder of the shaft bushing 16 by spring means such as bellows 14 and gas forces, with the pressure of the supplied sealing liquid being only slightly above the gas pressure in the inner space. Because of this, the slip ring seal at gap 26 acts as a shutdown seal.

At higher speeds, the pressure of the sealing liquid is built up to a pressure above the supply pressure by the rotation of the disk 7 in an outer area or outer region 10 of the pump chamber 9. This increased sealing liquid pressure is transmitted through bores 11 into the pressure chamber 12. This overcomes the axial force in a direction toward the outer space 2 while is exerted by the bellows 14 and the gas pressure in the inner space 1, and the slip ring 13 moves in the axial direction away from the shaft bushing shoulder to a stop 27 of the seal housing 8. This causes a great enlargement of the sealing gap 26 and the sealing function of the slip ring 13 is stopped and it is thereby protected against wear.

A seal is then provided by the action of the inner floating ring 15 that then acts as a threaded shaft seal. For this function sealing grooves 35 are incorporated in the shaft bushing 16 and they limit the flow of sealing liquid to the inner space because the threads provide an opposing transport action operating optimally at this speed. In case of large pressure differences between the feed bore and the inner space, a rotating ring of sealing liquid can then be formed at the end of the threaded shaft toward the inner space between the shaft bushing shoulder and the slip ring face that defines the sealing gap, which can contribute to limiting the amount of inner sealing liquid by its pumping action.

Figure 2:
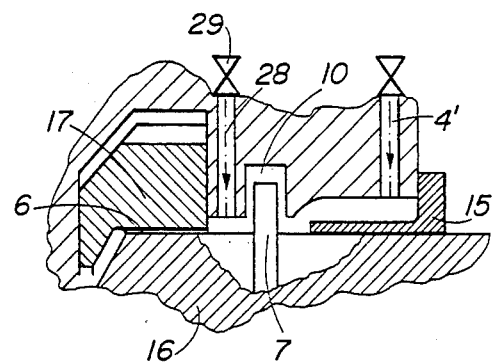
FIG. 2 is an enlarged sectional view of another embodiment with a separate supply of sealing liquid to the shaft seal.

The embodiment of FIG. 2 provides for an additional feed line or bore 28 with a throttle 29 that feeds a portion of the sealing liquid directly to the outer sealing gap 6 in case of very large amounts of sealing liquid.

Figure 3:
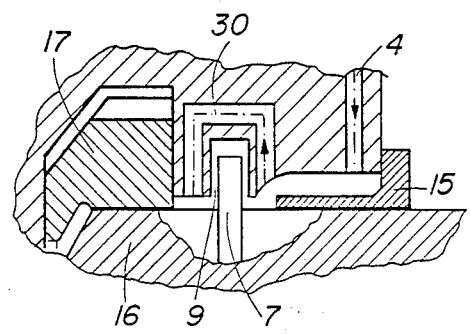
FIG. 3 is an enlarged sectional view of another embodiment with a bypass line for sealing liquid.

The embodiment of FIG. 3 shows another method of bypassing the sealing liquid around the pump chamber 9 by means of bypass bores 30.

Figure 4:
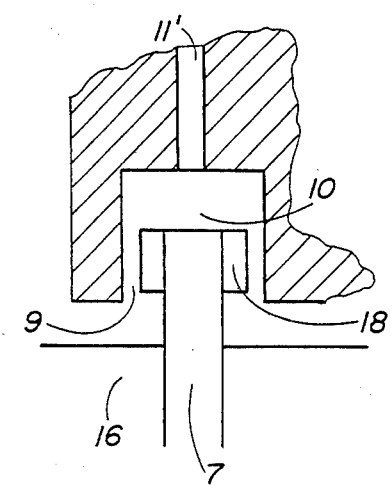
FIG. 4 is an enlarged sectional view of another embodiment with a disk with projections on both sides.

In FIG. 4, projections 18 are attached to the disk 7 to control beneficially the radial pressure rise.

Figure 5:
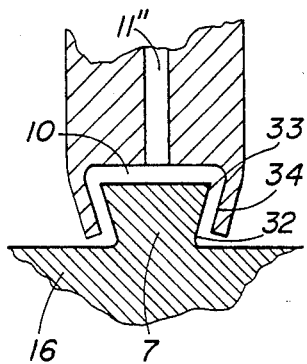
FIG. 5 is an enlarged sectional view of another embodiment with a disk with extensions and constrictions on both sides.

FIG. 5 shows a disk 7 with axial extensions 33 and constrictions 32 and a conforming design of the opposite pump chamber walls 34.

Figure 6:
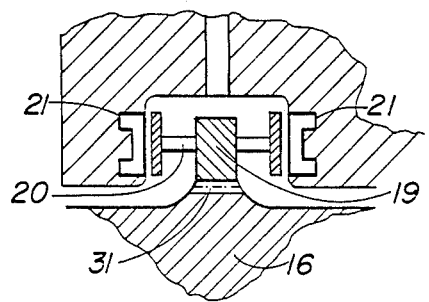
FIG. 6 is an enlarged sectional view of another embodiment with a disk movable on the shaft with spacers.

The FIG. 6 embodiment shows an axial mobility of the ring 19 through a guide 31 on the shaft bushing 16. The guide 31 in the example of embodiment is designed as channel gearing. Axial spacers 20 maintain a constant distance from the seal housing, which is designed as axial bearings 21 in this area.

Figure 7:
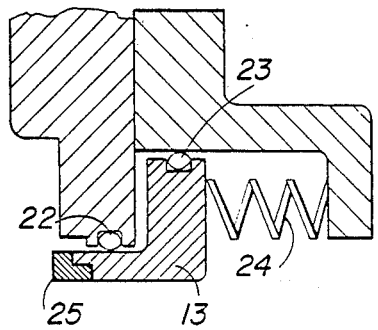
FIG. 7 is an enlarged sectional view of another embodiment with another design of the seal of the pressure chamber.

The FIG. 7 embodiment illustrates sealing of the slip ring 13 with a carbon insert 25 by gaskets 22 and 23 and the production of the pressure force by compression springs 24. All of the embodiments may be used on the arrangement of FIG. 1.

What is claimed is:

1. A liquid-sealed shaft seal comprising: a shaft housing, shaft rotatably supported in said housing and together defining an inner space on one side of said housing which is sealed with respect to an outer space on the opposite side of said housing, said housing having feed bores for sealing liquid which is supplied at a higher pressure than the pressure of said inner space, said housing and said shaft defining annular first and second partial seal gaps on respective sides of said feed bores, a disk carried by said shaft of a larger diameter than said partial seal gaps, said housing forming a pump chamber around said shaft and said disk in which there is a radially extending pressure increase of the supplied liquid from said feed bores during shaft rotation at higher speeds, said housing having bores opening into the radially outer end portion of said pump chamber from said feed bores, a slip ring over said shaft adjacent the inner space end of said housing defining a high pressured chamber between said slip ring and said housing and connected to the radially outer area of said pump chamber, said shaft having a portion opposite said slip ring defining one of said first and second partial seal gaps, spring means in said housing urging said slip ring toward said shaft portion and pressing it against said shaft portion when said shaft is stopped or rotates at low speeds to close partial seal gap, said high pressure chamber producing a pressure on said slip ring at higher speeds to displace said slip ring away from said shaft, said partial seal gaps on the side of feed passages adjacent said inner space comprising a threaded shaft seal including threads defined between said housing and said shaft defining a passage extending from said inner space toward said outer space.

2. A liquid-sealed shaft according to claim 1 including a floating ring between said housing and said shaft axially interior of said slip ring defining said partial seal gap with said shaft.

3. A liquid-sealed shaft seal according to claim 2 wherein said floating ring is L-shaped and cross section.

4. A liquid-sealed shaft seal according to claim 1 including a shaft bushing around said shaft and a floating ring exposed over said bushing and defining one of said partial seal gaps.

5. A liquid-sealed shaft according to claim 1 including at least one floating around said shaft defining said seal gap.

6. A liquid-sealed shaft according to claim 1 including a projection formed on said disk operable with said disk in said pump chamber.

7. A liquid-sealed shaft according to claim 1 wherein said disk has axially extending extensions and said pump chamber includes walls forming constrictions extending on each side of said extensions.

8. A liquid-sealed shaft according to claim 1 wherein said disk comprises a ring which is moveably supported on said shaft and guides means of said guide shaft for guiding said ring.

9. A liquid-sealed shaft seal according to claim 8 including spaces carried by said ring and extending outwardly into said pump chamber said pump chamber having walls on each side of said spaces with bearing services for said spacers.

10. A liquid-sealed shaft seal according to claim 1 wherein spring means comprises a bellows connected between said housing and said slip ring and including a gasket between said slip ring and said housing.

11. A liquid-sealed shaft seal according to claim 1 including a gasket sealing said ring in its radial outer area with said housing wherein said spring means comprises a spring disposed between said slip ring and said housing.

* * * * *